(12) United States Patent
Hu et al.

(10) Patent No.: US 7,054,871 B2
(45) Date of Patent: May 30, 2006

(54) METHOD FOR IDENTIFYING AND USING TABLE STRUCTURES

(75) Inventors: Jianying Hu, Westfield, NJ (US); Ramanujan S. Kashi, Bridgewater, NJ (US); Daniel P. Lopresti, Hopewell, NJ (US); Gordon T. Wilfong, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 817 days.

(21) Appl. No.: 09/734,057

(22) Filed: Dec. 11, 2000

(65) Prior Publication Data

US 2003/0097384 A1   May 22, 2003

(51) Int. Cl.
*G06F 17/00* (2006.01)

(52) U.S. Cl. .......................................... 707/100; 707/4

(58) Field of Classification Search ................ 707/2, 707/3, 4, 100; 382/175, 176; 715/513
See application file for complete search history.

(56) References Cited

U.S. PATENT DOCUMENTS

| | | | | |
|---|---|---|---|---|
| 5,893,127 A * | 4/1999 | Tyan et al. | .................. | 715/513 |
| 6,275,608 B1 * | 8/2001 | Tezuka | ....................... | 382/175 |
| 6,356,888 B1 * | 3/2002 | Egan et al. | ..................... | 707/2 |
| 6,356,897 B1 * | 3/2002 | Gusack | .......................... | 707/4 |
| 6,694,053 B1 * | 2/2004 | Burns et al. | ................. | 382/176 |

\* cited by examiner

*Primary Examiner*—Sam Rimell (57) ABSTRACT

A method for recognizing a table structure from delineated table region in an electronic document using hierarchical clustering of data strings. The cluster groupings are segregated effectively using the distances from a positional vector associated with words and groups of words rather than a minimum number of blank spaces between words. Once a data tree of the hierarchical clusterings is constructed, the tree is scanned downward from the root to find appropriate column boundaries using a columnization algorithm. Then using successive heuristic algorithms, determine column and row headers and row boundaries.

19 Claims, 9 Drawing Sheets

| Company | Todays | | Yesterdays | |
| --- | --- | --- | --- | --- |
| | Open | Change | Open | Change |
| Blue, Inc | 75 1/2 | +1 1/8 | 74 9/16 | -4 1/4 |
| Green.Com | 89 1/4 | +2 | 88 5/8 | -2 13/16 |
| Red, Inc | 22 1/4 | +5/16 | 21 13/16 | -3/8 |
| Yellow Ltd | 103 3/8 | -1 13/16 | 101 | -4 |
| Purple, Inc | 27 11/16 | -2 5/8 | 27 5/8 | -1 1/8 |
| Brown.Com | 68 | +11/16 | 66 11/16 | -1 5/8 |
| Pink Ltd | 130 7/16 | +1 1/16 | 130 | -2 3/8 |

Class 1 — questions about the graph structure (but not its content).

130  Probe
132  How many nodes labeled Row?
     How many nodes labeled Column?

Class 2 — involve the contents of ACells and DCells.

134  Probe
136  Exists ACell with content RowHead1?
138  Exists DCell with content D1?
     Exists DCell with content D6?

Class 3 — mimic database-type queries

140  Probe
142  Content at RowHead1 X ColHead2?
144  Content at RowHead2 X ColHead1?
     Content at RowHead3 X ColHead1?

Class 1 — questions about the graph structure (but not its content).

| | Graph in Figure 1 | Graph in Figure 3 | Agree? |
|---|---|---|---|
| Probe | | | |
| How many nodes labeled Row? | 4 | 3 | no |
| How many nodes labeled Column? | 3 | 3 | yes |

Class 2 — involve the contents of ACells and DCells.

| | Graph in Figure 1 | Graph in Figure 3 | Agree? |
|---|---|---|---|
| Probe | | | |
| Exists ACell with content RowHead1? | yes | yes | yes |
| Exists DCell with content D1? | yes | yes | yes |
| Exists DCell with content D6? | yes | no | no |

Class 3 — mimic database-type queries

| | Graph in Figure 1 | Graph in Figure 3 | Agree? |
|---|---|---|---|
| Probe | | | |
| Content at RowHead1 X ColHead2? | D2 | D2 | yes |
| Content at RowHead2 X ColHead1? | D3 | D3 | yes |
| Content at RowHead3 X ColHead1? | D5 | ? | no |

Fig. 9

METHOD FOR IDENTIFYING AND USING TABLE STRUCTURES

FIELD OF THE INVENTION

This invention pertains to the field of transformation of information contained in an electronic document, and more particularly to a method for identifying and using the structure of tables in electronic documents across multiple media and interaction modalities.

BACKGROUND OF THE INVENTION

Conventional approaches to text-to-speech translation of electronic documents typically involve first transforming the data from one of a wide variety of document formats (i.e. picture elements (pixels) of scanned documents or proprietary formats such as those used by MS Word™ or Word Perfect™) into a more universal format, such as ASCII text, by using optical character recognition (OCR) algorithms. The translated data block is then presented to a speech creation mechanism.

While such techniques work well for contiguous blocks of text, the presence of tables within such documents typically results in an indecipherable block data for each table region, and effectively renders a text-to-speech system useless. Further, since the data contained in the table region cannot be identified, queries for extracting any information contained in those tables cannot be answered. Thus, special algorithms for automatically identifying and translating table regions in electronic documents have been promulgated.

Such algorithms have traditionally depended on either the detection of ruled border lines or on an analysis of organized patterns of blank spaces, or columnization of data, between text characters that represent cells of the table. Once a table is delineated and the text cells defined, the information contained in the cells could be made available to electronic queries and for importing to database processing applications.

Although most of the work in this field is related to extracting information contained in scanned binary images, the problem of table detection in text files has also been addressed. The problem with conventional approaches is that they tend to address only narrow issues related to the characteristics of a particular application, and a universal method for detecting and using tables across all applications has not heretofore been available. The reason for the difficulty in defining a single solution algorithm is that applications may or may not contain: tables; border lines; a fixed number of blank spaces between columns; multi-line rows; multi-line column headers; or a clearly vertical column definition due to skewing.

In U.S. Pat. No. 5,737,442, to Alam, discloses an algorithm using character/space content of a line or group of lines for identifying columnization of characters along white space "plumb lines" and the subsequent use of "white-space vector intersections" that can be processed against a maximum/minimum criteria to identify the table structure. Text areas are grouped into rectangles, and the plumb lines are created as being centered on the white space between these rectangles. The principal disadvantage of such an approach is that the dependency on orthogonal white spaces and row separator lines can prevent the reformulation of the table when such white spaces are either irregular, missing, or less than a minimum "acceptance criteria."

SUMMARY OF THE INVENTION

According to a preferred embodiment of the present invention, a structure is derived for a table region in an electronic document by the hierarchical grouping of the words included in an identified table region into a cluster tree based on horizontal distances among positional vectors associated with words. Column boundaries are then obtained by a scanning the cluster tree using a breadth-first algorithm, which defines nodes based on an inter-cluster separation gap algorithm. Column and row headers are then extracted using heuristic algorithms employing both hierarchical clustering of data strings and semantic analysis. Table rows are then defined using a heuristic algorithm and semantic analysis of the words in the identified table region.

The reformulated table can then be probed using a user-friendly query method, such as speech, to allow the flexible, user-driven extraction of data contained in the table. Finally, a method is provided for determining the accuracy of such table reformulation methods using a multitude of probes to produce results that can be compared with a reference set of results.

DETAILED DESCRIPTION OF THE INVENTION

In order to extract information from an electronic document having identified table regions, such table regions must be parsed into a logical structure to which queries can be addressed. Within the table region, the task of defining and delineating the cells comprising the table is particularly difficult when the cells either are non-uniform in size and spacing or have no defining ruled borders. When other possible irregularities, such as skewed columns or inadequate spacing between particular column elements, are considered, conventional pattern techniques are unable to define the tabular structure.

According to a preferred embodiment of the present invention, a structure of a table region can be determined using a sequence of algorithms that segregate the columns and rows of such a table. These algorithms further determine the column and row headers, when present, to enable the use of electronic and/or voice queries of the table elements. The following discussion assumes that the table region has already been delineated by other means, such as the methods described in U.S. patent application Ser. No. 09/398,122.

Figure 1:
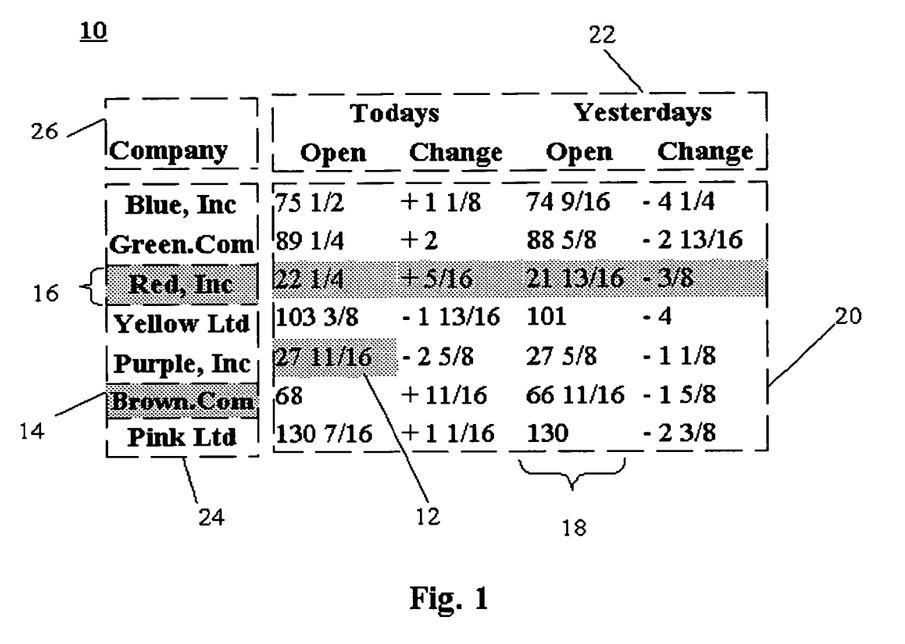
FIG. 1 shows the structural elements of an exemplary table.

FIG. 1 shows the structural elements of an exemplary table 10. For the following discussion, a table is considered to be comprised of data cells (Dcells) 12 and access cells (Acells) 14. These cells are organized into rows 16 and columns 18, either or both of which may or may not include headers. The collection of Dcells comprises body 20. The regions containing column headers 22 and row headers 24, if present, are labeled box region 22 and stub region 24, respectively. The header for box/stub 26, if present, is labeled either box head and stub head, respectively.

To reformulate a table, the start and end of table 10, which have been previously identified by other means, are input with the raw data to a table reformulation algorithm, which will identify and extract the multitude of table elements. For purposes of clarity, the following will use an exemplary table comprised of ASCII text characters. The use of the text characters is exemplary only, and is not intended to restrict the scope of the invention, which can be used for any number of document and image formats. The methods described apply equally well to other forms of electronic documents containing tables, such as scanned images represented by picture elements (pixels) or bit maps.

A first step in the table reformulation is the segregation of the columns. To accomplish this, a horizontal positional vector (span), $p(s_i, e_i)$, where $s_i$ is the start position and $e_i$ is the end position relative to the left edge of a page, is determined for each word in the raw data in the entire table region, with no distinction being made between body 20 and box/stub header regions 22 through 26. Since the columns are generally grouped along a vertical direction, this vector denotes the horizontal position of the starting and ending characters of the word within the table region. Next a cluster tree is created, which consists of leaves or unique clusters, where each cluster is a single word in the raw data, where word means any consecutive sequence of non-white-space characters.

To create each node of the cluster tree, a distance is calculated between every two clusters using the Euclidean distance between the two associated position vectors associated with those clusters, or satisfying the equation $$dist_{i,j} = [(s_i - s_j)^2 + (e_i - e_j)^2]^{1/2} \quad (1)$$

where $s_i$ and $e_i$ are the horizontal starting and ending positions of cluster i and $s_j$ and $e_j$ are the starting and ending positions of the cluster j, respectively.

Note that distances other than the spatial distance can be used for this calculation. For example, a syntactic distance (e.g. a numeric string vs. an alphabetic string) or semantic distance (e.g. a numeric string representing a date vs. a numeric string representing a dollar value) can be used depending on the application. Once the distances have been calculated, the collection of distances are scanned to find the minimum inter-cluster distance. The two clusters associated with that minimum distance are then merged to create a new cluster at a next higher interior node of the tree, with the two original clusters as its children.

The inter-cluster distances are then recalculated with the new cluster added to the cluster family, and a new minimum distance is determined. For merged clusters, the average distance of all the individual inter-cluster distances within the cluster pair is used to represent the inter-cluster distance for the cluster pair. The merging process is repeated recursively until there is only one cluster left without a parent, which is then represented by the root node of the tree.

Figure 2:
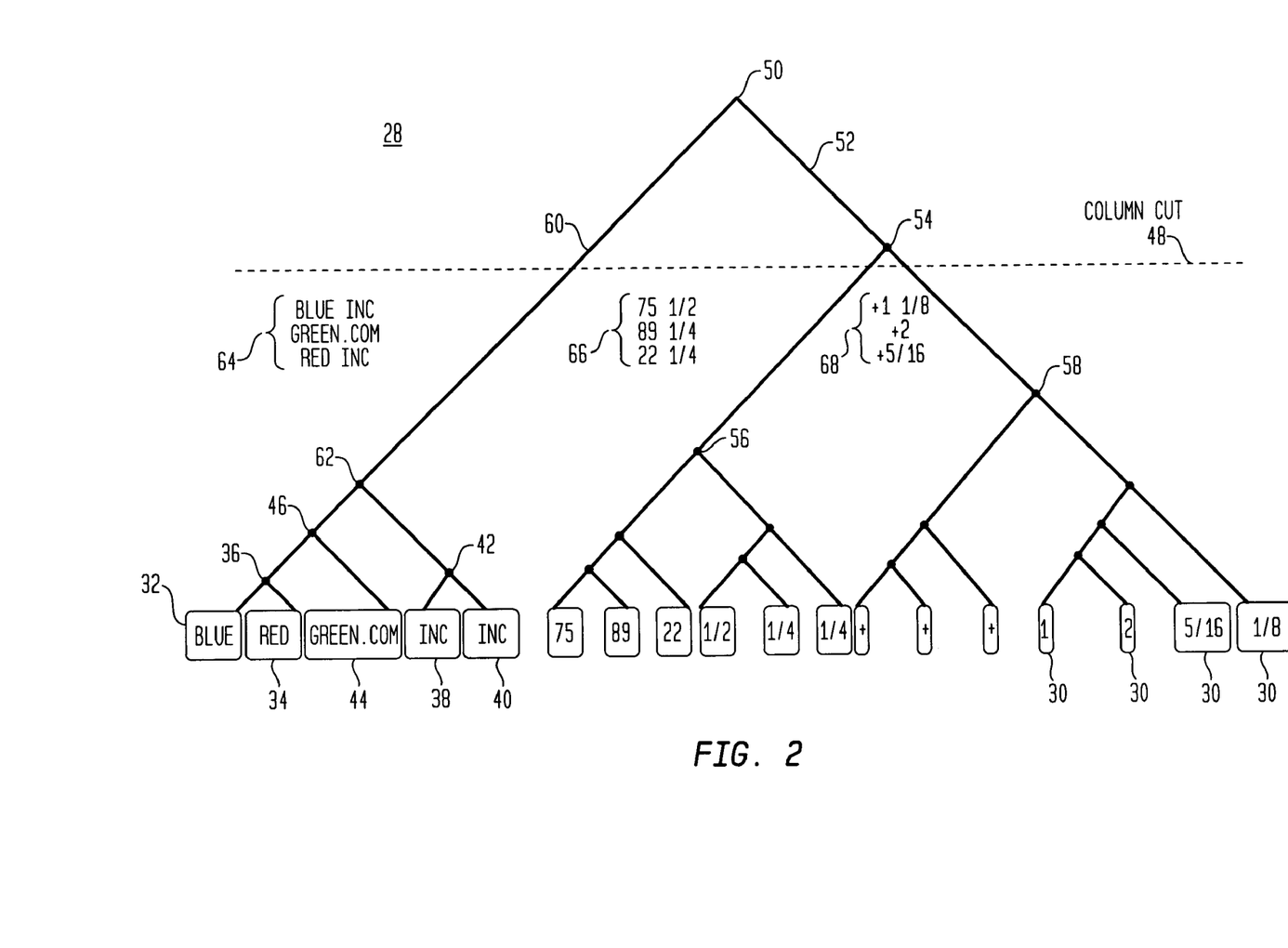
FIG. 2 shows an exemplary tree generated from a portion of the table of FIG. 1.

To better understand the above process, FIG. 2 shows a resultant tree 28 generated according to the present invention using a simplified portion of the first three lines of FIG. 1. A multitude of leaves 30 or unique clusters (single words) are generated from the raw data. The individual leaves of each of these clusters are merged to form the next higher node of the hierarchical tree. For example, at the lowest level, leaves 32 and 34 are merged to form a new cluster at higher level node 36. Similarly, leaves 38 and 40 are merged to form a new cluster at higher level node 42. At the next higher level nodes just created, cluster 36 is merged with original leaf 44 to form a second new cluster at node 46, and so on.

The cluster tree generated represents the hierarchical structure of the table body in terms of the vertical grouping of words. It can be intuitively seen that the inter-cluster distances become grouped according to similar distance values. Thus, according to the present invention, the cluster groupings are segregated effectively using the distances among the positional vector of words and groups of words rather than a minimum number of blank spaces between words.

While conventional columnization methods can be applied successfully to a vast majority of commonly used tables, there are exceptions for which columns are not easily extracted by methods relying on a minimum number of blank spacings, such as a column of surnames or city names, for example. Such names can be extremely short, or can fill a column cell completely, both occurring in a same column or in an adjacent column. This causes non-uniform spacing between column entries and, thus, the inability to detect or differentiate between columns.

For example, consider two horizontally adjacent column entries both sufficiently long to fill the total column space and create only a single blank space between the column entries. While the human eye can readily distinguish the column boundaries, computer algorithms have great difficulty in making such a determination. The methods similar to the device by Alum would fail to appropriately divide the exemplary column entries by looking for two blank spaces, the columnization methods of the present invention would still be able to calculate the positional vectors and inter-cluster distances, which only require a single separator between words. Thus, the hierarchical cluster tree can still be created for such a table according to the present invention.

After the creation of the cluster tree, a "best fit" for the column boundaries can be found by applying a reverse process of column cutting on the generated cluster tree. The column cut is found using a breadth-first traversal of the cluster tree starting at the root, as indicated by line 48 in FIG. 2.

Two queues are created for the cutting process. A first queue initially contains only the root node of the cluster tree. Working progressively from the root node, each node in the cluster tree is examined to see if it can appropriately be split into smaller clusters based on an analysis of an inter-cluster gap between the individual clusters comprising that node. If the node can be split, then its children are pushed to the end of the first queue. If the node cannot be split, then the node is moved from the first queue and into the second queue. When the last node is moved from the first to the second queue, then the columns are defined by the nodes that are included in the second queue.

The criteria for splitting a nodes is:

1) if the node is the root node, it is split, since a table is assumed to have at least two columns;

2) if $g \geq (G)$ $\quad (2)$ where g is the inter-cluster gap and G is a predetermined constant (typically set to 2). In other words a large enough gap always indicates a column separation; and $$\text{3) if } g<G \text{ and } g/m_g>\alpha \tag{3}$$

where $m_g$ is the average inter-cluster gap between adjacent pairs of already identified columns (e.g. nodes already in the second queue) and $\alpha$ is a number between 0 and 1. The selection of the value $\alpha$ depends on the document be transformed, but the value will generally be closer to "1" in the preferred embodiment, which is defined as a gap which is close to the median gap of the already identified columns, and being slightly, but not significantly smaller. An exemplary $\alpha$ of 0.8 would be used in the preferred embodiment.

To demonstrate to above method, cutting line 48 of FIG. 2 descends the tree beginning at root node 50. Two "branches" split from root node 50. After traversing a first branch 52 to a descendant node 54, equations 2 and 3 are applied to node 54. The determination is that node 54 can be further split into child nodes 56 and 58, which are appended to the first queue. By further application of equations 2 and 3 to these child nodes, it is determined that they cannot be split and nodes 56 and 58 are moved from the first queue into the second queue, and the analysis of branch 52 is completed.

Traversing the other branch 60 from root node 50, node 62 is analyzed using equations 2 and 3. A determination is made that node 62 cannot be split, and node 62 is moved from the first queue into the second queue. The cutting process is now completed since there are no further nodes in the first queue. Extracting the resulting nodes from the second queue, the column segregations are shown by line 48, and nodes 56, 58, and 62 represent the "best-fit" columns. The details of the clusters representing the columns is represented in the data groups labeled 64, 66, and 68.

In summary, according to the preferred embodiment of the present invention, columnization of entries in an identified tabular region can best be obtained by 1) hierarchically sorting words or groups of words based on the relative horizontal distances between positional vectors of words, and 2) cutting the resultant cluster tree using the separation gaps between the ends of words.

It should be noted that hierarchical clustering can be applied successfully to tables having imperfect vertical alignment, such as the column labeled 18 in FIG. 1. It is also evident that the method of the present invention is independent of presence of lines in the table and can be applied to formatted as well as "flat" files, since the column extraction algorithm is based solely on the inter-cluster distances.

A second step in the table reformulation is the identification of column headers, if present. The identification mechanism consists of the steps of:

1) defining box region 22 by:
  a) sorting the columns according to horizontal starting position; and
  b) adjusting the upper boundary of the table using a consistency check; and
2) extracting the header information included in box region 22 using a phrase segmentation process.

The sorting and adjusting steps of 1) provide an unambiguous definition of the bottom of box region 22 through a content analysis of table lines to delineate the upper limit of table body 20. Once the columns of table 10 are selectively arranged according to starting position, a predetermined number of lines, B, directly above the delineated table region are set aside as a possible box region 22 (e.g. column and table headers lines), five lines, for example.

On a column by column basis, each of the individual words in the remainder of table 10 (the area predominantly consisting of table body 20) are then examined to determine a string type for the column as being alphabetic (composed of mostly alphabetic characters) or non-alphabetic. A dominant string type parameter, $S_{dn}$, is then defined for each column. For binary image documents, this step would be performed as a post-optical character recognition (OCR) step.

Beginning at the bottom line of the above potential box region 22, each word of the line is evaluated with its associated column, and a determination is made as to string-type consistency with the particular $S_{dn}$ of that column. If the word is predominately comprised of a string type that matches $S_{dn}$, the word is defined as being consistent, or else it is defined as not being consistent. After all the words of the line under test are evaluated, a quality metric is derived to indicate whether the majority of the words on that line are consistent or not consistent with their associated $S_{dn}$s. If the metric indicates consistency, then the line is considered to be part of the body, and the next line upward is then tested. If at any point the quality metric indicates non-consistency, then that inconsistent line is considered to be a header line and the lower line of box region 22, and the box definition process is terminated. The column headers, if any, are now included in a region which is inclusively bordered by the lowest non-empty line in box region 22 and the line immediately below the next empty line above this lower boundary, or B lines above this lower boundary, whichever is lower.

The phrase segmentation process of the column header identification process then extracts the contents of the column headers. Beginning at the lowest line of the just defined region of column header lines, each line is segregated into phrases, or separable strings, (i.e. separation being defined by a predetermined number of consecutive blank spaces: at least two spaces, for example). The spans of the above derived columns are compared with the spans of each individual phrase to create a list of overlapping associated columns.

A list of associated columns is computed for each phrase in box region 22 based on the following criteria:

1) each phrase must be associated with at least one column; and
2) if a phrase is associated with more than one column, the subsidiary columns (typically the columns below it) must already have its own header identified.

Figure 3:
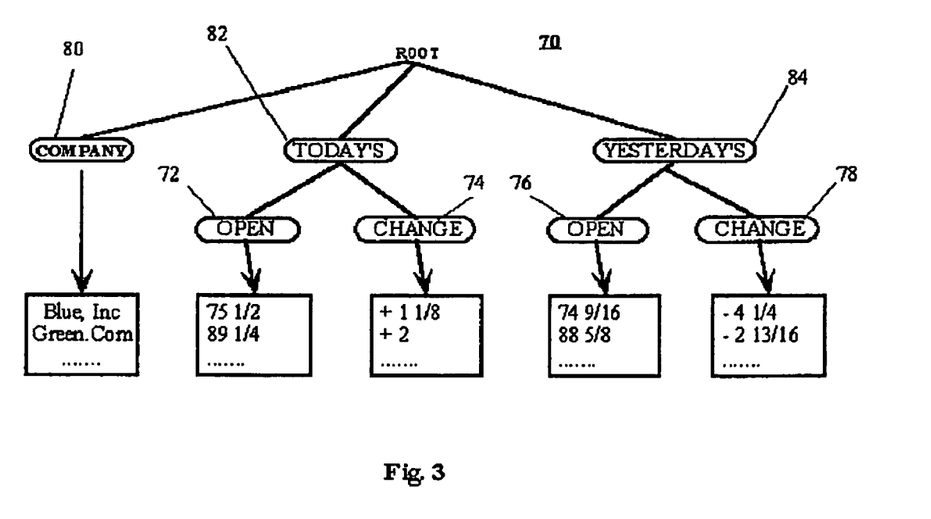
FIG. 3 shows a tree having hierarchical nodes comprised of the column headers of FIG. 1.

To create the hierarchical structure of the column headers, a tree is created with box region 22 as the root and the columns represented as the leaf nodes. "Joint span", $p_{1,n}$, can be defined for a list of n spans, $p_i=(s_i, e_i)$, as $$p_{1,n}=(\min(s_i), \max(e_j)) \ i=1 \text{ to } n, j=1 \text{ to } n \tag{4}$$

where $s_i$ is the starting horizontal position of the ith string and $e_i$ is the ending horizontal position of the ith string. This corresponds to a span that has either a starting or ending position that is located inside a defined boundary of a first column and an opposite ending or starting position, respectively, that is located outside that first column boundary. A boundary of a second column, which includes this opposite position is then grouped with the first column to define a higher level column (joint) boundary. This is demonstrated in FIG. 3, which shows an exemplary tree 70 having hierarchical nodes comprised of the column headers included in FIG. 1.

The column header tree is created in a bottom-up manner. A leaf node is created whenever a first level header, such as header 72, 74, 76 or 78, is detected. Once any higher level header, such as header 80, 82, or 84, is found, a corresponding intermediate node is added to tree 70, and the joint span of its subsidiary nodes is used to analyze the next line. In tree 70, higher level headers 82 and 84 each have a subsidiary nodes pair, 72–74 and 76–78, respectively. After header tree 70 is created, it is traversed to assign headers to each column of the structure, with higher level headers being shared by more than one column.)

A third step in the table reformulation is the identification of row headers, if present. Since the preferred embodiment of the present invention does not address dual side-by-side tables on a same page, it is assumed that row headers will always be located in the first column of the positional-sorted columns. The identification mechanism consists of:

1) if the column header of the leftmost column is missing, then the column is tentatively labeled stub region 24;

2) since the leftmost column can either be stub region 24 or part of the body 20, a semantic analysis is performed on the potential row header words or groups of words to determine appropriateness as row headers. This includes comparison with the semantic content of Dcells 12 in body 20. Note that an analysis of a single column may not be accurate in that both a text Dcell and a numeric Dcell can exist in the same column. Simplified examples of such row header analysis could include the tentative stub having an ordered ascending numbering, text elements in a table where the remaining columns are numeric, comparison with know text words and phrases used in row headings, etc.

A last step in the table reformulation is the segregation of the rows. Although some rows may contain more than one line or there may be no obvious separation between rows, each table row contains only one core line and any partial (non-core) lines, if present, are considered to be grouped with the core line above it. The algorithm for discerning the separation is based on the following criteria:

1) a blank line is always a row separator;

2) a line is considered a core line, if and only if:

a) a line contains non-empty strings in the stub, if present, and at least one other column; or b) a line contains non-empty strings for a majority of the columns;

3) all other lines are defined as partial lines.

Occasionally, there are core lines where the partial lines are grouped above it, but such cases are easily detected using statistical analysis methods, such as N-grams, for example. For other unique cases, such as when hierarchical row headers are projected onto a single column, which causes the higher level header to be undetected and merged with neighborhood lower level header, semantic analysis techniques previously discussed are required to resolved the formulation problem.

When the table reformulation is completed, the electronic structure is stored and can be queried using a variety of means. A typical query is constructed using the available header words of the column-row pair of Acells in order to find a string or numeric value contained in an intersecting D-cell. For an ASCII text formatted table, a copy of the ASCII strings can be returned to the querying module. For an exemplary query, parsed words from the query are compared with a stored list of table header keywords that were extracted from during the table reformulation process. Search keywords are also parsed from the query to identify the action to be taken during the tabular search. Exemplary search keywords could be "find", "what is", "minimum", "maximum", "less than", "greater than", etc. When a column and row match of keywords occurs, an x-y alphanumeric index is defined as an offset into a two-dimensional array comprised of the locations and the contents of each Dcells of reformulated table body 20. Depending on the type of query, either the content or the location of the identified Dcell is returned to the querying module. Further, in the event that a particular table does not have headers, or for searches that use only alphanumeric labels for the columns and rows, the query mechanism must have the capability of indexing the table using only these row-column identifiers.

For example, in the Table of FIG. 1, a query could request Today's opening price for Purple, Inc. The keyword definitions would match the corresponding row and column headers, to yield the Dcell 12 with a value of $27^{11}/_{16}$. Alternatively, a query requesting the Yesterday's lowest opening price for the stocks in the table, and the process would scan the matrix entries defined by the Yesterday's and Open column 18 to find the lowest entry, $21^{13}/_{16}$, which corresponds to row 16. Traversing the matrix indicates the row and row header label, which is returned as the query response. It is evident that query processing time can be significantly reduced by storing row and column numbering and labels along with the Dcell content at each matrix location at the time the table is reformulated.

Queries using speech would have to first interpreted and transformed into a compatible electronic format before parsing the query into keywords for the above process. The response likewise would have to be transformed to a compatible format for either screen text display or sound transmission. Such voice query transformation can be best accomplished using a variation of a direct acyclic graph (DAG) to quickly search the graph for the appropriate Acells and to interpret the returned results from the identified Dcell.

Figure 4:
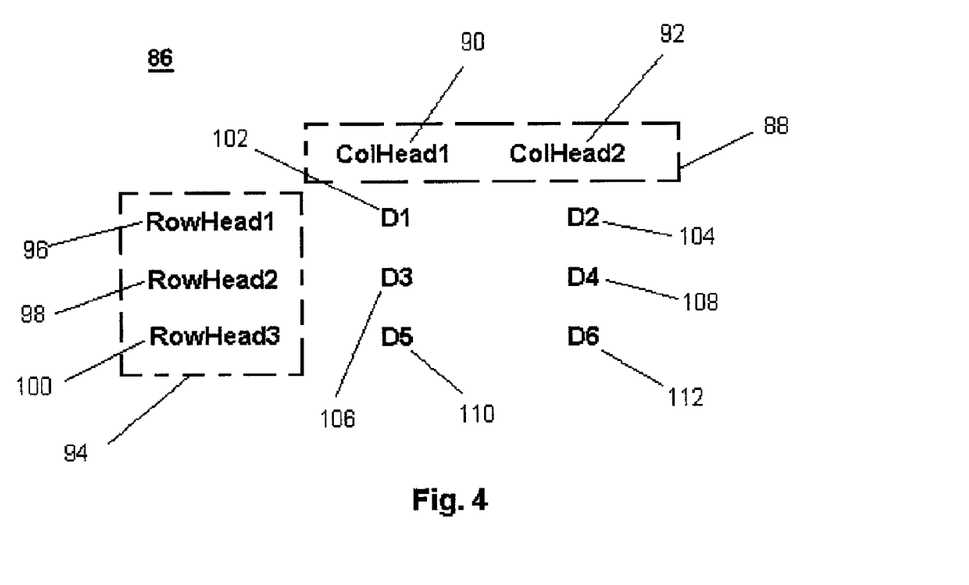
FIG. 4 shows a simplified exemplary table having 3 columns and 4 rows.

In order to better understand the methods for creating and using the Table DAG according to the present invention, consider FIG. 4, which shows a simplified exemplary table 86 having 3 columns and 4 rows. Box 88 includes the column headers 90 and 92 in the first row, and stub 94, i.e. the first column of table 86, includes three row headers 96, 98, and 100. The Dcells labeled 102, 104, 106, 108, 110, and 112 represent the body of table 86.

Figure 5:
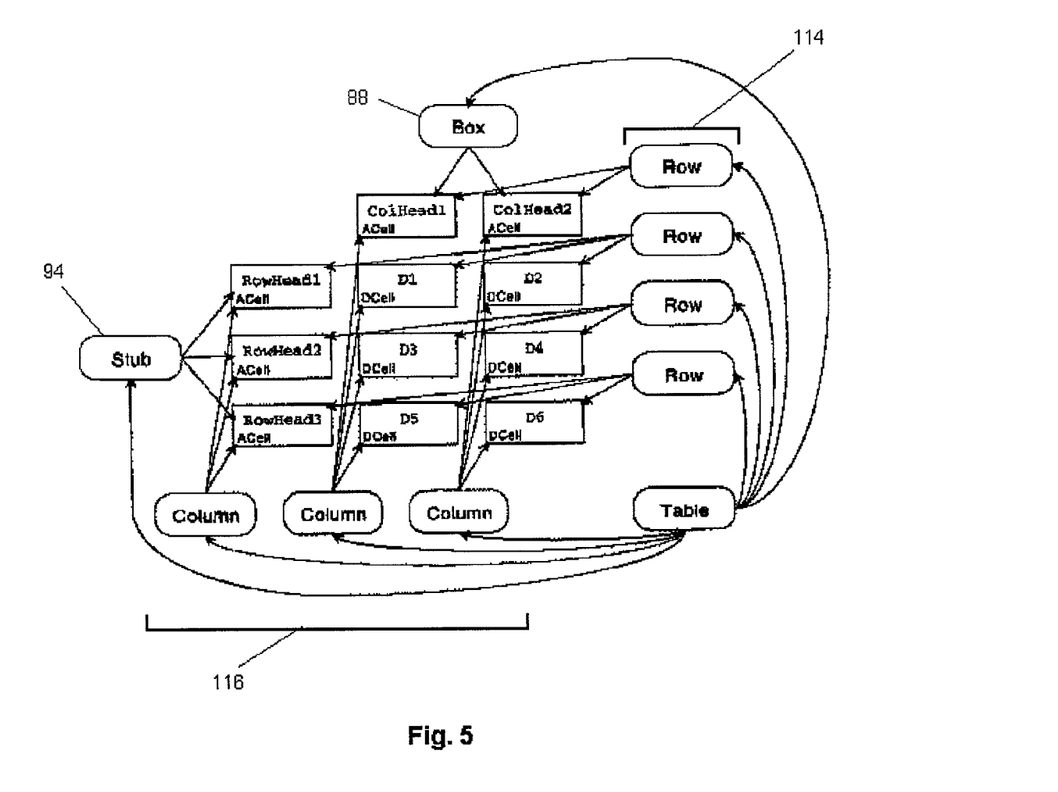
FIG. 5 shows a graphical representation of the elements of the table shown in FIG. 4.

FIG. 5 shows a graphical representation of the elements of table 86. Intermediate nodes identifying the individual rows 114, columns 116, box 88, and stub 94 of table are added. Rearranging the table representation of FIG. 5 can produce the graphical representation 118 show in FIG. 6. For clarity, the representation in FIG. 6 does not show all the edges that were present in FIG. 5. Note that the rearrangement produces a table structure that is more suitable for accessing Acells of the original table. Probing two Acells results in one or more Dcells that reside at the intersection of those probes.

Figure 6:
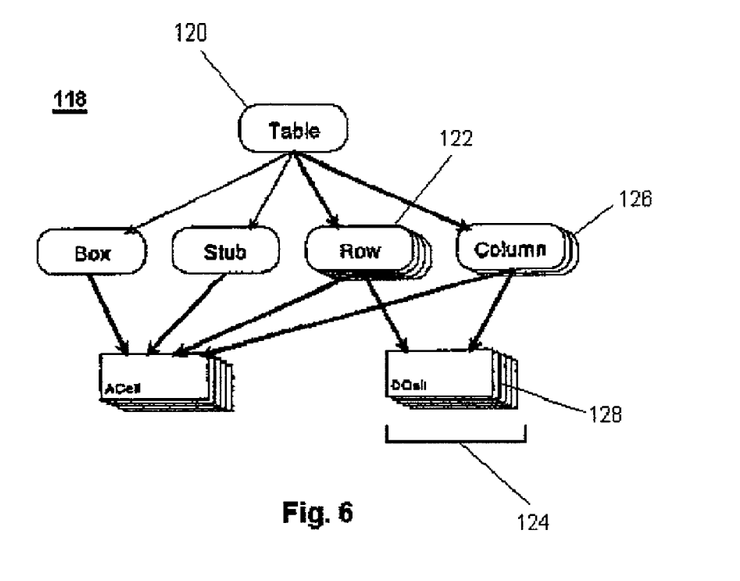
FIG. 6 shows an alternate graphical representation of the elements of FIG. 5.

For example, a probing algorithm enters the structure at a table entry node 120. Then depending on the specific inquiry, a traversal is made via other selected nodes of the graphical structure to arrive at desired Dcell or group of Dcells. An exemplary inquiry to return the content of a Dcell located at the third column of the second row, would traverse the second branch of the collection of row nodes 122 to arrive at a specific group of Dcells in a multitude of Dcells 124. The second portion of the probe traverses via the multitude of column nodes 126 to arrive at one specific Dcell 128 within the group of Dcells. Alternatively, for an inquiry requesting the content of all Dcells in third column, the second portion of the above probe would be unnecessary.

It can readily be seen that any element of table 86 in FIG. 4 can be ascertained using the just-described methods.

Further, once such a graphical structure is reformulated, a multitude of queries having a variety of forms can be easily applied to the structure. An example of an interactive dialog with the reformulated structure using speech as the interface might be as follows:

System: I have found a table having four rows and three columns. The Column headings are labeled ColHead1 and ColHead2. What next?

User: Read Column 1

System: Column 1 contains RowHead1, RowHead2, and RowHead3. What next?

User: What is ColHead2 for RowHead2?

System: ColHead2 for RowHead2 is D4.

From the foregoing, it can be readily seen that any detail or characteristic of the reformulated table structure can be obtained with an appropriate inquiry or probe.

To determine the quality of the table structure reformulated using the above methods, a qualification method can be employed which compares the results of a series of queries applied to the structure with a reference list of results that are obtained by other means. For example, a human visual determination of a table structure can provide the reference list. Applying an appropriate number of queries to the derived graphical structure will yield intermediate results that when compared with an associated result included in the reference list will yield a true/false probe result. The proportion of the true vs. the false probes will accurately describe the quality of the derived table structure.

Figure 7:
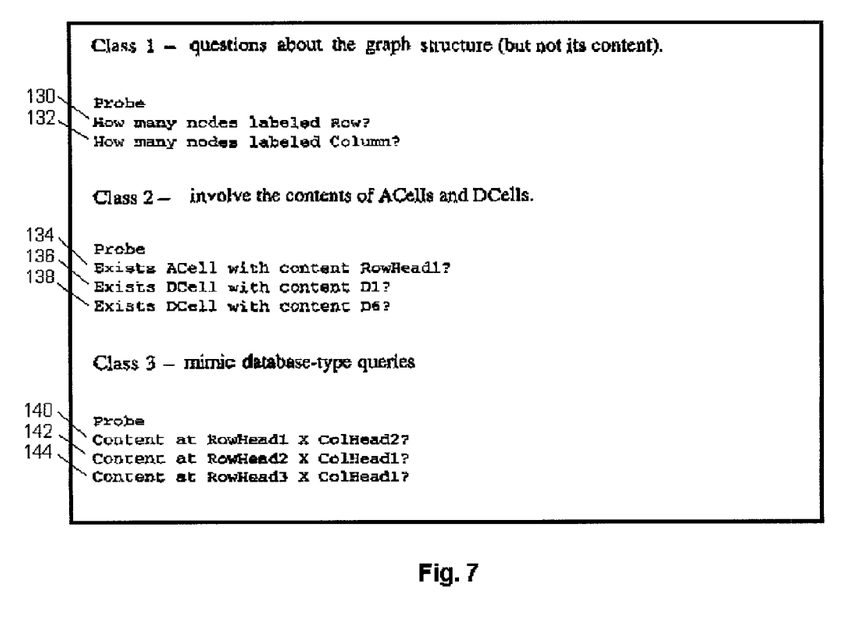
FIG. 7 shows an exemplary list of such classes and possible probe examples in each class.

For example, a possible categorization of interactive qualification probes could be: Class I—probes relating to structure of the table, Class II—probes relating to content of the table, and Class III—probes similar to database queries (i.e. complex combinations of Class I and Class II probes). FIG. 7 shows an exemplary list of such classes and possible probes examples in each class. Probes 130 and 132 request information regarding the nodal structure of the graph. Probes 134, 136, and 138 request content of Acells and Dcells in the table body. Finally, probes 140, 142, and 144 query specific rows, columns, or cells depending on the specific nature of the inquiry.

Figure 8:
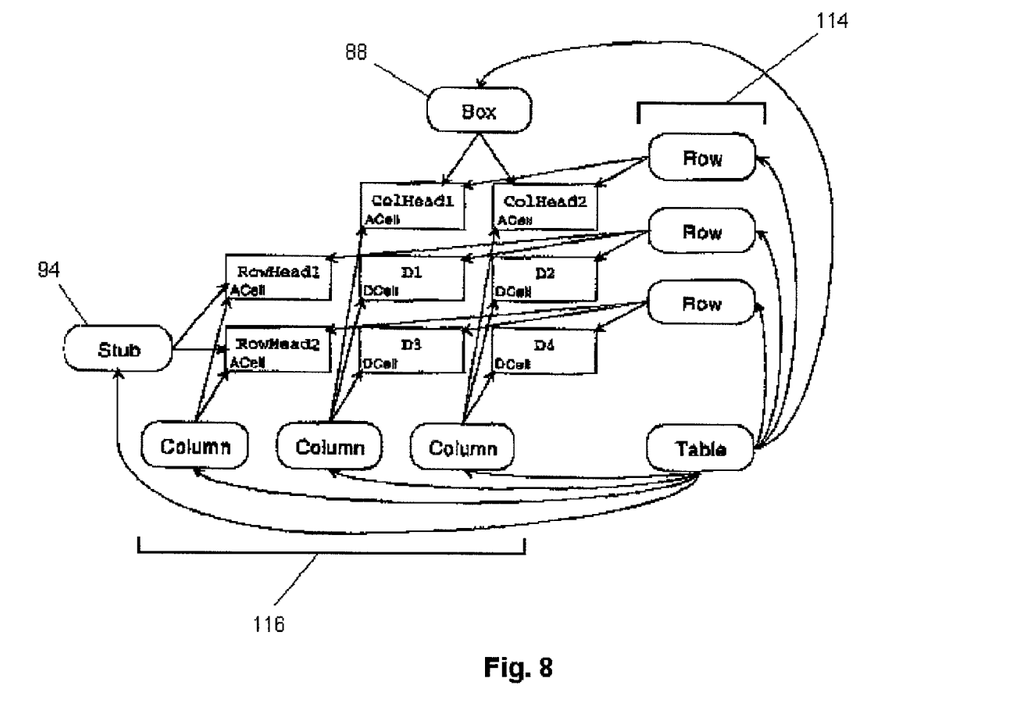
FIG. 8 shows a graph that is erroneously obtained using an exemplary reformulation method to be tested.
Figure 9:
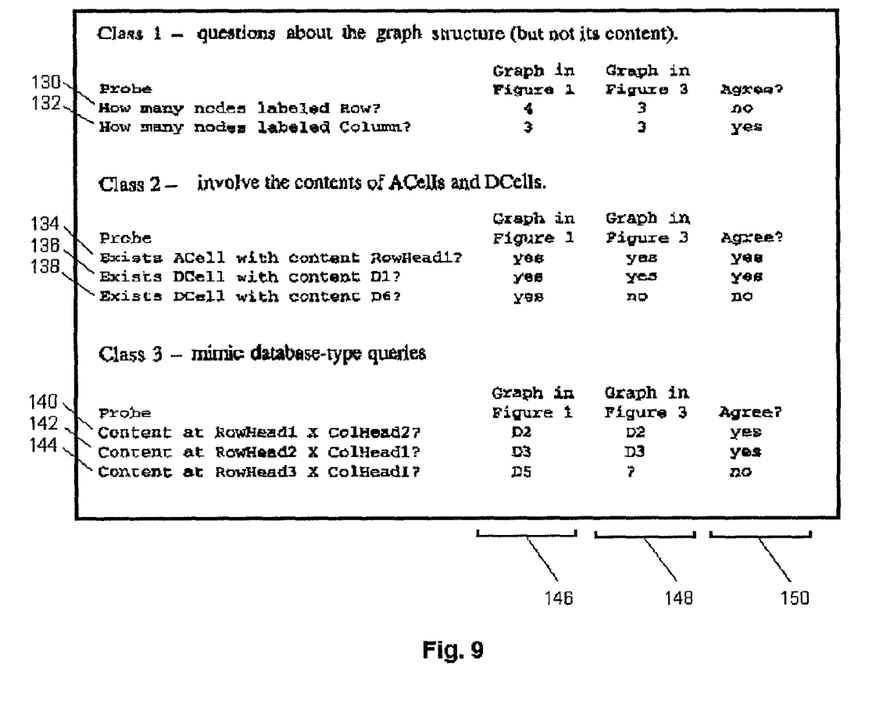
FIG. 9 shows added columns indicating the results of the probes shown in FIG. 7.

The use of these probes can best be illustrated by an exemplary problem wherein a reference graph is identical to FIG. 4 and a graph as shown in FIG. 8 is erroneously obtained using a reformulation method to be tested. In this example, the reformulation method omits the last row of the table. FIG. 9 shows added columns indicating the results of the probes shown in FIG. 7. Column 146 represents the probe responses associated with the reference queries. Column 148 represents the probe responses associated with the erroneous reformulation shown in FIG. 8. Column 150 represents the collection of true/false resultants from the comparisons of columns 146 and 148. From the above example, five of 8 probes produced agreement or 62.5%. This level of disagreement would clearly indicate that an inaccurate reformulation occurred. It is evident from the above that the greater number of probes that are used, the greater the accuracy of the quality FIG. of merit.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. A method performed by a computer system containing programming for reformulating raw data appearing in a delineated table region of an electronic document into a table structure, comprising the steps of:
    a) reading raw data, said raw data spatially arranged in a delineated table region of an electronic document, said raw data, as read, lacking hierarchical arrangement sufficient to enable a logical query of said raw data based on said spatial arrangement;
    b) creating a binary tree using a hierarchical clustering of a plurality of words included in said raw data;
    c) segregating a plurality of columns from the raw data using a breadth-first traversal algorithm;
    d) identifying column headers, if any, from the plurality of columns using a first heuristic algorithm;
    e) identifying row headers, if any, from the column headers using a second heuristic algorithm;
    f) segregating at least one row from the raw data using a row determination algorithm; and
    g) storing the plurality of columns and the at least one row into a table structure.

2. The method according to claim 1, wherein the hierarchical clustering further comprises the steps of:
    a) generating a plurality of leaf clusters;
    b) calculating a plurality of inter-cluster distances for each one of a plurality of clusters;
    c) merging the two clusters having a minimum inter-cluster distance calculated in b) to create a new cluster;
    d) creating an interior node of the binary tree with the said two clusters as its children; and
    e) repeating steps b) through d) until there is only one cluster left without a parent.

3. The method according to claim 2, wherein each one of the plurality of leaf clusters comprises a single one of said plurality of words.

4. The method according to claim 2, wherein the inter-cluster distance is determined by an algorithm comprising the steps of:
    a) calculating a position vector (span) for each one of the plurality of words, said span comprising the starting and ending horizontal position of each said word; and
    b) determining a unique separation distance between each unique cluster of the plurality of clusters and each one of the other clusters in the plurality of clusters by:
        1) using positional vector subtraction of the individual cluster positional vectors when each cluster is comprised of a single word; and
        2) when at least one of the clusters is a merged cluster, computing the average separation distance of all the unique inter-cluster separation distances comprising the cluster pair.

5. The method according to claim 4, wherein the distance comprises one from the group consisting of geometric, syntactic, and semantic.

6. The method according to claim 1, wherein the breadth-first traversal algorithm comprises the steps of:
    a) beginning at the root node, split the node into two nodes and determine whether the two split nodes can be split into subordinate nodes based on a spacing decision criteria;
    b) if a node cannot be split, move the node into a storage buffer, else repeat step (a for any remaining nodes; and
    c) when all nodes have been moved into the storage buffer, the columns are defined as the nodes in the storage buffer.

7. The method according to claim 6, wherein the spacing decision criteria comprises the splitting of the node if and only if:
 a) the node is the root node;
 b) if $g \geq G$; or
 c) if $g < G$ and $g/m_g > \alpha$
 where g is a gap between clusters, G is a predetermined constant, $m_g$ is an average gap between adjacent pairs of already identified columns, and $\alpha$ is a number between 0 and 1.

8. The method according to claim 6, additionally including the step of sorting columns according to a starting position of each one of the plurality of columns.

9. The method according to claim 8, additionally including the step of adjusting the upper boundary of the table region by performing a consistency test.

10. The method according to claim 9, wherein the consistency test comprises the steps of:
 a) calculating a predominate string type for each one of the plurality of columns included in the table region (column type);
 b) starting at a predetermined number of table lines below the start of the table region, calculating a unique string type for each one of the plurality of words in said table line (word type);
 c) comparing each one of the plurality of word types with the associated column type;
 d) generating a plurality of metrics associated with the result of said comparisons; and
 e) if a majority of said metrics are true, identifying the current line as the bottom line of the box region and ending the consistency test, or else moving up one table line and repeating steps c) and d).

11. The method according to claim 1, wherein the first heuristic algorithm for identifying column headers comprises the steps of:
 a) dividing each table line into a plurality of unique separable strings;
 b) creating a hierarchical tree having a box as the root, each one of the plurality of table columns as the leaves, and higher level headers as intermediate nodes of said tree;
 c) calculating a joint span for each one of the plurality of separable strings using the equation
 $p_{1,n} = (\min(s_i), \max(e_i))$ $i=1$ to n
 d) comparing the boundaries of each one of the plurality of joint spans with the boundaries of each one of the plurality of table columns; and
 e) creating a list of associated columns that have overlapping boundaries in b) using a boundary criteria.

12. The method according to claim 11, wherein each one of the separable strings are delineated by a predetermined number of blank spaces.

13. The method according to claim 11, wherein the boundary criteria further comprises the steps of:
 a) associating each phrase with at least one column; and
 b) if a phrase is associated with more than one column, the subsidiary columns must already have its own header filled.

14. The method according to claim 1, wherein the second heuristic algorithm for identifying row headers comprises the steps of:
 a) identifying a region as a stub region if the left-most column does not include a column header;
 b) performing a semantic analysis of the data contents of the left-most column if the left-most column does include a column header; and
 c) detecting and storing the unique row headers for each line from steps a) and b).

15. The method according to claim 1, wherein the row determination algorithm comprises the steps of:
 a) defining a row separator if said row comprises a blank line;
 b) determining at least one core row, comprising:
  1) a row having a non-empty suing in a stub region and having at least one other column; or
  2) a row having non-empty strings in a majority of the columns of the table; and
 c) determining non-core rows, if any.

16. The method according to claim 15, wherein non-core rows comprise all rows that are not core rows.

17. The method according to claim 1, additionally including the step of testing of said delineated table by creating a directed acyclic graph.

18. The method according to claim 17, additionally including the step of testing of said delineated table by logically probing said directed acyclic graph.

19. The method according to claim 18, wherein the step of testing said table comprises the comparison of responses from a plurality of logical tests conducted on said graph with an associated plurality of predetermined reference responses.

* * * * *